(12) United States Patent
Goossens (10) Patent No.: US 7,769,893 B2
(45) Date of Patent: Aug. 3, 2010

(54) INTEGRATED CIRCUIT AND METHOD FOR ESTABLISHING TRANSACTIONS

(75) Inventor: Kees Gerard Willem Goossens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1128 days.

(21) Appl. No.: 10/530,425

(22) PCT Filed: Jul. 4, 2003

(86) PCT No.: PCT/IB03/03036

§ 371 (c)(1),
(2), (4) Date: Apr. 5, 2005

(87) PCT Pub. No.: WO2004/034676

PCT Pub. Date: Apr. 22, 2004

(65) Prior Publication Data

US 2006/0095920 A1    May 4, 2006

(30) Foreign Application Priority Data

Oct. 8, 2002  (EP) .................................. 02079196

(51) Int. Cl.
*G06F 15/16* (2006.01)

(52) U.S. Cl. ................ 709/245; 709/203; 709/220; 709/227

(58) Field of Classification Search ............. 705/76; 709/201, 203, 220, 223–229, 245, 253; 726/14; 370/293, 389, 401, 405, 462

See application file for complete search history.

(56) References Cited

U.S. PATENT DOCUMENTS

| | | | | |
|---|---|---|---|---|
| 6,018,782 A | * | 1/2000 | Hartmann | ............... 710/310 |
| 6,381,638 B1 | * | 4/2002 | Mahler et al. | ............... 709/220 |
| 6,400,715 B1 | * | 6/2002 | Beaudoin et al. | ............ 370/392 |
| 6,446,173 B1 | * | 9/2002 | Pham | ............................ 711/147 |
| 6,567,969 B1 | * | 5/2003 | Agrawal et al. | ............... 716/17 |
| 6,594,704 B1 | * | 7/2003 | Birenback et al. | ............ 709/238 |

(Continued)

FOREIGN PATENT DOCUMENTS

| EP | 1 083 768 | 3/2001 |
|---|---|---|
| EP | 1083768 | * 3/2001 |

OTHER PUBLICATIONS

Guerrier, P. et al., "A Generic Architecture for On-Chip Packet Packet-Switched Interconnections", IEEE Conf. Proceedings, 278 Mar. 2000, pp. 250-256.*

Sgroi et al., "Addressing the System-on-a-Chip Interconnect Woes Through Communication-Based Design", 2001, ACM, pp. 667-672.*

(Continued)

*Primary Examiner*—Saleh Najjar
*Assistant Examiner*—Sarah E Drabik (57) ABSTRACT

An integrated circuit is provided comprising a plurality of master and slave modules and a network arranged for transferring messages between the modules, wherein a message issued by a master module comprises first information indicative for a location of a slave (addressed) module within the network, and second information indicative for a location within the addressed module. The integrated circuit further comprises at least one address translation means for arranging the first and the second information as a single address. The address translation means is adapted to determine which slave module is being addressed based on the single address, and the selected location of the slave (addressed) module is determined based on the single address. Accordingly, use of an address translation means for address mapping allows the design of the master modules to be implemented independent of address mapping.

11 Claims, 2 Drawing Sheets

U.S. PATENT DOCUMENTS 6,768,742 B1 * 7/2004 Godfrey .................. 370/400
2002/0144078 A1 * 10/2002 Topham et al. ............. 711/203
2005/0050297 A1 * 3/2005 Essick et al. .............. 711/207

OTHER PUBLICATIONS

Sgroi et al., "Addressing the System-on-a-Chip Interconnect Woes Through Communication-Based Design", 2001, ACM, pp. 667-672.*

Guerrier P. et al "A Generic Architecture for On-Chip Packet-Switched Interconnections" IEEE Conf. Proceedings, 278 Mar. 2000, pp. 250-256.

S Kumar et al "A Network on Chip Architecture and Design Methodology" IEEE Computer Society Annual Symposium on VLSI, Pittsburgh, PA, USA, Retrieved From the Internet.

* cited by examiner

INTEGRATED CIRCUIT AND METHOD FOR ESTABLISHING TRANSACTIONS

FIELD OF THE INVENTION

The invention relates to an integrated circuit having a plurality of processing modules and a network arranged for transferring messages between processing modules and a method for exchanging messages in such an integrated circuit.

BACKGROUND OF THE INVENTION

Systems on silicon show a continuous increase in complexity due to the ever increasing need for implementing new features and improvements of existing functions. This is enabled by the increasing density with which components can be integrated on an integrated circuit. At the same time the clock speed at which circuits are operated tends to increase too. The higher clock speed in combination with the increased density of components has reduced the area which can operate synchronously within the same clock domain. This has created the need for a modular approach. According to such an approach the processing system comprises a plurality of relatively independent, complex modules. In conventional processing systems the systems modules usually communicate to each other via a bus. As the number of modules increases however, this way of communication is no longer practical for the following reasons. On the one hand the large number of modules forms a too high bus load. On the other hand the bus forms a communication bottleneck as it enables only one device to send data to the bus. A communication network forms an effective way to overcome these disadvantages.

Networks on chip (NoC) have received considerable attention recently as a solution to the interconnect problem in highly-complex chips. The reason is twofold. First, NoCs help resolve the electrical problems in new deep-submicron technologies, as they structure and manage global wires. At the same time they share wires, lowering their number and increasing their utilization. NoCs can also be energy efficient and reliable and are scalable compared to buses. Second, NoCs also decouple computation from communication, which is essential in managing the design of billion-transistor chips. NoCs achieve this decoupling because they are traditionally designed using protocol stacks, which provide well-defined interfaces separating communication service usage from service implementation.

Using networks for on-chip communication when designing systems on chip (SoC), however, raises a number of new issues that must be taken into account. This is because, in contrast to existing on-chip interconnects (e.g., buses, switches, or point-to-point wires), where the communicating modules are directly connected, in a NoC the modules communicate remotely via network nodes. As a result, interconnect arbitration changes from centralized to distributed, and issues like out-of order transactions, higher latencies, and end-to-end flow control must be handled either by the intellectual property block (IP) or by the network.

Most of these topics have been already the subject of research in the field of local and wide area networks (computer networks) and as an interconnect for parallel machine interconnect networks. Both are very much related to on-chip networks, and many of the results in those fields are also applicable on chip. However, NoC's premises are different from off-chip networks, and, therefore, most of the network design choices must be reevaluated. On-chip networks have different properties (e.g., tighter link synchronization) and constraints (e.g., higher memory cost) leading to different design choices, which ultimately affect the network services. Storage (i.e., memory) and computation resources are relatively more expensive, whereas the number of point-to-point links is larger on chip than off chip. Storage is expensive, because general-purpose on-chip memory, such as RAMs, occupy a large area. Having the memory distributed in the network components in relatively small sizes is even worse, as the overhead area in the memory then becomes dominant.

For on-chip networks computation too comes at a relatively high cost compared to off-chip networks. An off-chip network interface usually contains a dedicated processor to implement the protocol stack up to network layer or even higher, to relieve the host processor from the communication processing. Including a dedicated processor in a network interface is not feasible on chip, as the size of the network interface will become comparable to or larger than the IP to be connected to the network. Moreover, running the protocol stack on the IP itself may also be not feasible, because often these IPs have one dedicated function only, and do not have the capabilities to run a network protocol stack.

The number of wires and pins to connect network components is an order of magnitude larger on chip than off chip. If they are not used massively for other purposes than NoC communication, they allow wide point-to-point interconnects (e.g., 300-bit links). This is not possible off-chip, where links are relatively narrower: 8-16 bits.

On-chip wires are also relatively shorter than off chip allowing a much tighter synchronization than off chip. This allows a reduction in the buffer space in the routers because the communication can be done at a smaller granularity. In the current semiconductor technologies, wires are also fast and reliable, which allows simpler link-layer protocols (e.g., no need for error correction, or retransmission). This also compensates for the lack of memory and computational resources.

Data ordering: In a network, data sent from a source to a destination may arrive out of order due to reordering in network nodes, following different routes, or retransmission after dropping. For off-chip networks out-of-order data delivery is typical. However, for NoCs where no data is dropped, data can be forced to follow the same path between a source and a destination (deterministic routing) with no reordering. This in-order data transportation requires less buffer space, and reordering modules are no longer necessary.

Introducing networks as on-chip interconnects radically changes the communication when compared to direct interconnects, such as buses or switches. This is because of the multi-hop nature of a network, where communication modules are not directly connected, but separated by one or more network nodes. This is in contrast with the prevalent existing interconnects (i.e., buses) where modules are directly connected. The implications of this change reside in the arbitration (which must change from centralized to distributed), and in the communication properties (e.g., ordering, or flow control).

Transaction Ordering: Traditionally, on a bus all transactions are ordered (cf. Peripheral VCI, AMBA, or CoreConnect PLB and OPB). This is possible at a low cost, because the interconnect, being a direct link between the communicating parties, does not reorder data. However, on a split bus, a total ordering of transactions on a single master may still cause performance penalties, when slaves respond at different speeds. To solve this problem, recent extensions to bus protocols allow transactions to be performed on connections. Ordering of transactions within a connection is still preserved, but between connections there are no ordering constraints (e.g., OCP, or Basic VCI). A few of the bus protocols allow out-of-order responses per connection in their advanced modes (e.g., Advanced VCI), but both requests and responses arrive at the destination in the same order as they were sent.

In a NoC, ordering becomes weaker. Global ordering can only be provided at a very high cost due to the conflict between the distributed nature of the networks, and the requirement of a centralized arbitration necessary for global ordering. Even local ordering, between a source-destination pair, may be costly. Data may arrive out of order if it is transported over multiple routes. In such cases, to still achieve an in-order delivery, data must be labeled with sequence numbers and reordered at the destination before being delivered. The communication network comprises a plurality of partly connected nodes. Messages from a module are redirected by the nodes to one or more other nodes. To that end the message comprises first information indicative for the location of the addressed module(s) within the network. The message may further include second information indicative for a particular location within the module, such as a memory, or a register address. The second information may invoke a particular response of the addressed module.

Destination Name and Routing: For a bus, the command, address, and data are broadcasted on the interconnect. They arrive at every destination, of which one activates based on the broadcasted address, and executes the requested command. This is possible because all modules are directly connected to the same bus. In a NoC, it is not feasible to broadcast information to all destinations, because it must be copied to all routers and network interfaces. This floods the network with data.

SUMMARY OF THE INVENTION

It is an object of the invention to provide an integrated circuit and a method for exchanging messages in an integrated circuit without introducing to many data into the network.

This object is achieved by an integrated circuit according to claim 1 and a method for exchanging messages according to claim 6.

Therefore, an integrated circuit comprising a plurality of modules M, S, and a network N arranged for transferring messages between said modules M, S is provided, wherein a message issued by a first module M comprises first information indicative for a location of an addressed module within the network, and second information indicative for a location within the addressed module S. Said integrated circuit further comprises at least one address translation means AT for arranging the first and the second information as a single address. Said address translation means AT is adapted to determine which module is addressed based on said single address, and the selected location of the addressed module S is determined based on said single address Accordingly, the design of the first modules, i.e. master modules, can be implemented independent of the address mapping to the addressed modules, i.e. the slave modules. Furthermore, a more efficient network resource utilization is achieved and this scheme is backward compatible with busses. The addressing is performed by the address translation means.

According to an aspect of the invention, said integrated circuit comprises at least one interface means ANIP, PNIP associated to one of the modules M, S for managing the communication between said associated module M, S and the network N. Said address translation means AT is arranged in one of said interface means ANIP, PNIP.

According to a further aspect of the invention, said address translation means AT is arranged in said interface means ANIP, PNIP associated to said first module M.

According to still a further aspect of the invention, said address translation means AT comprises an address mapping table, in order to store the relation between the global and local memory mapping.

According to a further aspect of the invention, said address mapping table is static, programmable or dynamic.

According to still a further aspect of the invention, said address mapping table contains fields for every channel of a connection, for network interface ports ANIP, PNIP of a connection, and for local addresses in addressed modules S.

The invention also relates to a method for exchanging messages in an integrated circuit comprising a plurality of modules M, S, the messages between the modules M, S being exchanged via a network N, wherein a message issued by a module M comprises first information indicative for a location of an addressed module S within the network, and second information indicative for a location within the addressed module S. Address translation AT is performed by arranging the first and the second information as a single address. Said address translation determines which module is addressed based on said single address, and the selected location of the addressed module (S) is determined based on said single address.

The invention is based on the idea to hide the addressing of data from a master module.

Further aspects of the invention are described in the dependent claims.

These and other aspects of the invention are apparent from and will be elucidated with reference to the embodiment(s) described hereinafter.

DESCRIPTION OF THE PREFERRED EMBODIMENTS

The following embodiments relate to systems on chip, i.e. a plurality of modules on the same chip communicate with each other via some kind of interconnect. The interconnect is embodied as a network on chip NOC. The network on chip may include wires, bus, time-division multiplexing, switch, and/or routers within a network. At the transport layer of said network, the communication between the modules is performed over connections. A connection is considered as a set of channels, each having a set of connection properties, between a first module and at least one second module. For a connection between a first module and a single second module (i.e. simple connection), the connection comprises two channels, namely one from the first module to the second channel, i.e. the request channel, and a second form the second to the first module, i.e. the response channel. The request channel is reserved for data and messages from the first to the second, while the response channel is reserved for data and messages from the second to the first module. However, if the connection involves one first and N second modules, 2*N channels are provided, in order to provide e.g. a multicast connection. Here, the first module issues requests to all second modules. The connection properties may include ordering (data transport in order), flow control (a remote buffer is reserved for a connection, and a data producer will be allowed to send data only when it is guaranteed that space is available for the produced data), throughput (a lower bound on throughput is guaranteed), latency (upper bound for latency is guaranteed), the lossiness (dropping of data), transmission termination, transaction completion, data correctness, priority, or data delivery.

Figure 1:
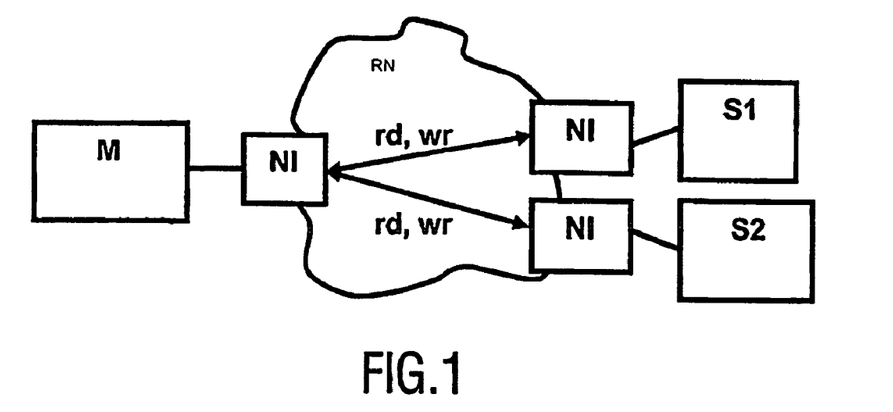
FIG. 1 shows a System on chip according to a first embodiment.

FIG. 1 shows a system on chip according to a first embodiment. The system comprises a master module M, two slave modules S1, S2. Each module is connected to a network N via a network interface NI, respectively. The network interfaces NI are used as interfaces between the master and slave modules M, S1, S2 and the network N. The network interfaces NI are provided to manage the communication of the respective modules and the network N, so that the modules can perform their dedicated operation without having to deal with the communication with the network or other modules. The network interfaces NI can send read rd and write wr requests and operations between each other over the network.

Figure 2:
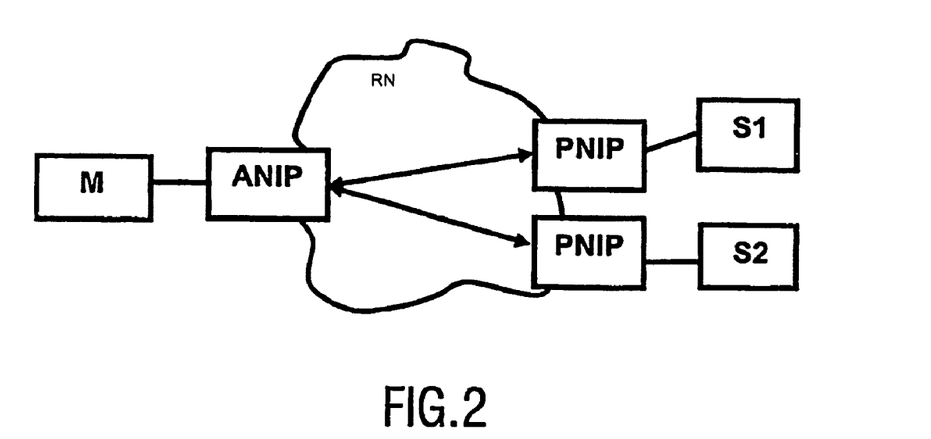
FIG. 2 shows a System on chip according to a second embodiment.

FIG. 2 shows a system on chip according to a second embodiment. The system comprises a master module M and two slave modules S1, S2, a router network RN, and three network interfaces ANIP, PNIP between the modules and the router network RN. The network interfaces provide two network interface ports NIP (one request and one response port) through which the modules communicate with the router network RN or other modules via the router network RN. The network interface ports associated to the master module M is called the active network interface ports ANIP and the network interface associated to the slave modules are called the passive network interface ports PNIP. The communication between the master module M and the slave modules S1, S2 is based on request-response transactions, where the master M initiates a transaction by placing a request, possibly with some data or required connection properties. The request REQ is delivered to the slave module S, via the active network interface port ANIP, the network RN and the passive network interface port PNIP. The request is executed by the slave module T and data is returned as a response RESP if necessary or required. This response RESP may include data and/or acknowledgement for the master M. A process on the master M may see an address map of 0-FF, which is allocated in the memories of the two slaves S1, S2, i.e. 0-7F in the memory of the first slave S1 and 80-FF in the memory of the second slave S2. An address can be decoded at the source to find a route to the destination module. A transaction address will therefore have two parts: (a) a destination identifier, and (b) an internal address at the destination.

Connections between the modules/network interfaces can be classified as follows:

A simple connection is a connection between one ANIP and one PNIP.

A multicast connection is a connection between one ANIP and one or more PNIPs, in which the sent messages are duplicated and each PNIP receives a copy of those messages. In a multicast connection no return messages are currently allowed, because of the large traffic they generate (i.e., one response per destination). It could also increase the complexity in the ANIP because individual responses from PNIPs must be merged into a single response for the ANIP. This requires buffer space and/or additional computation for the merging itself.

A narrowcast connection is a connection between one ANIP and one or more PNIPs, in which each transaction that the ANIP initiates is executed by exactly one PNIP. An example of the narrowcast connection, where the ANIP performs transactions on an address space which is mapped on two memory modules. Depending on the transaction address, a transaction is executed on only one of these two memories.

A narrowcast connection can be implemented by decoding each transaction address at the active network interface ports ANIP. According to the decoding, the target slave of the transaction is identified and the transaction request is only sent to that particular slave, i.e. the request will only be visible to the target slave and not to all of the slaves in the network.

Figure 3:
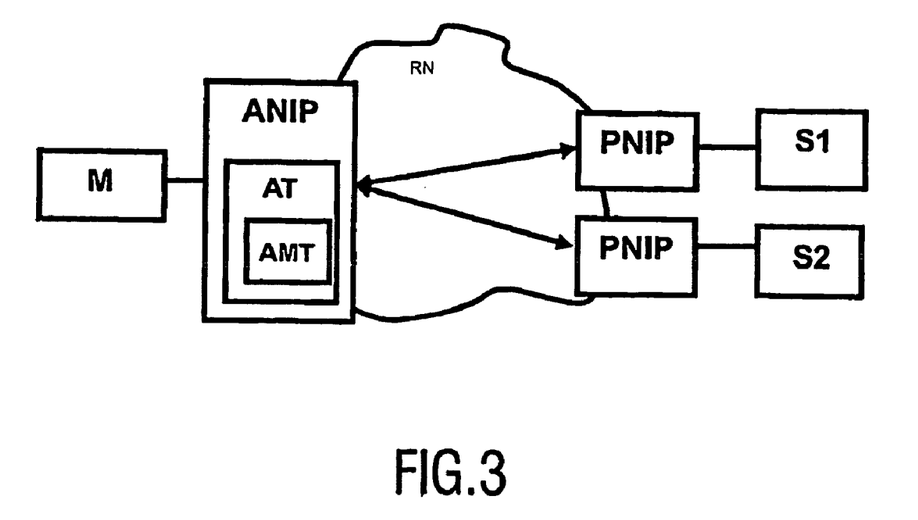
FIG. 3 shows a System on chip according to a third embodiment.

FIG. 3 shows a system on chip according to a third embodiment of the invention. The system according to the third embodiment is based on the system according to the second embodiment. Additionally, the active network interface ports ANIP comprise an address translation manager AT having an address mapping table AMT, wherein the address translation manager AT performs the decoding of address of the target slave based on information stored in an address mapping table AMT. Said address mapping table AMT can be implemented on a static, programmable or dynamic basis and may contain fields for every channel of a connection, for the connection identifier, for network interface ports ANIP, PNIP of a connection, and/or for local addresses in addressed modules S.

Every address in a slave has a global and a local address. The global address relates to address as seen from the processing on the master M and the local address relates to the address a slave. The address range of the global address may be 0000-FFFF, while a range within a slave may be 000-FFF.

The global address may be formed in different ways. Firstly, it is constituted by a network address and a local address. The network address may be the port identifier of the receiving module, i.e. the port_D of the passive network interface ports PNIP. Such a scheme would be backward compatible.

Secondly, the global address is constituted by a connection identifier (connection id) and a local address as minimum information or alternatively the connection identifier, the passive network interface ports PNIP and the local address. The provision of the passive network interface ports PNIP is in some cases redundant but increases the safety of the scheme. In the case of a master, a connection id identifies several slaves, and there should be some means to select one of them. The network interface port NIP address or global address (from which a passive network interface port PNIP id is derived) are still needed. In both cases (i.e., network interface (NI) address and global address), checks as means for selection are possible, as only a subset of the network interface ports NIPs are mapped to the connection:

a) The address translation is performed based on a connection id+ global address, i.e. on the passive network interface port PNIP id and the local address, possibly also with communication properties of the connection and check.

b) The address translation is performed based on a connection id, passive network interface port PNIP id+a local address, possibly also with communication properties of the connection and check.

In the case of a slave, a connection id is enough to determine the destination of data. This destination is the unique master connected at the unique ANIP of that connection.

As described above, the address translation is performed by the address translation manager AT in the active network interface, wherein the address translation manager AT comprises its own address mapping table AMT, where all information is stored which is required to perform the address translation. However, the address translation manager AT and/or the address mapping table AMT may also be arranged not in the network interface but centrally in the network N.

According to a further embodiment of the invention, the functionality of a narrowcast connection can also be achieved using simple or multicast connections, however at higher cost, with less flexibility and/or hampering the modules reusability. A narrowcast connection can be implemented using several simple connections to each slave module S. According to the address the master module M or its active network interface port ANIP selects an appropriate simple connection. Differential properties of the connection, i.e. different connection properties for the respective channels of a connection, can still be implemented per slave. However the master module M needs to know the allocation of the address map in advance, which will hamper the reusability. The usage of simple connection make the programming of the master module more difficult as multiple connection identifiers have to be managed. Multiple buffers, i.e. one for each simple connection, have to be allocated for the respective responses if multiple simple connection are used. However, this may require more memory than allocating a single larger buffer as used in narrowcast connections. For the case that ordered narrowcast transactions are required, these have to be implemented on a higher level, since no ordering guarantees are provided across connections.

Alternatively, a narrowcast connection may be implemented on the basis of multicast connections. A multicast connection connects a master M to one or more slaves S1, S2. For a transaction with a response, all slaves will respond but merely a single response is returned to the master. This filtering of response messages may be performed be an active network interface ANIP associated to the master. Alternatively, a narrowcast connection based on a multicast connection can be achieved by implementing a transaction filter at the slaves, i.e. the filtering is performed by a passive network interface PNIP associated to the slave. The PNIP decides to forward a transaction or not to the associated slave depending on the transaction address. However, since a multicast connection expects a response form each slave, the PNIPs must include empty responses, which can then be filtered by the ANIP or the module. This scheme allows simple programming of the master, since merely a single connection is involved. The reusability of the designs of the master modules M is also increased, since there is no need for being aware of the address allocation on the respective slaves. But a considerable amount of unnecessary network traffic, i.e. the traffic to and from the slaves not addressed, is generated for which buffering is also required. Finally, since the requests are send to every slave, a fine-tune of the differential bandwidth allocation per slave can be performed.

A transaction without a response (e.g. a posted write) is said to be complete when it has been executed by the slave. As there is no response message to the master, no guarantee regarding transaction completion can be given.

A transaction with a response (e.g. an acknowledged write) is said to be complete when a RETSTAT message is received from the ANIP. Recall that when data is received as a response (RETDATA), a RETSTAT (possibly implicit) is also received to validate the data. The transaction may either be executed successfully, in which case a success RETSTAT is returned, fail in its execution at the slave, and then an execution error RETSTAT is returned, or fail because of buffer overflow in a connection with no flow control, and then it reports an overflow error. We assume that when a slave accepts a CMD requesting a response, the slave always generates the response.

In the network, routers do not drop data, therefore, messages are always guaranteed to be delivered at the NI. For connections with flow control, also NIs do not drop data. Thus, message delivery and, thus, transaction completion to the IPs is guaranteed automatically in this case.

However, if there is no flow control, messages may be dropped at the network interface in case of buffer overflow. All of CMD, OUTDATA, and RETDATA may be dropped at the NI. To guarantee transaction completion, RETSTAT is not allowed to be dropped. Consequently, in the ANIPs enough buffer space must be provided to accommodate RETSTAT messages for all outstanding transactions. This is enforced by bounding the number of outstanding transactions.

Now the ordering requirements between different transactions within a single connection are described. Over different connections no ordering of transactions is defined at the transport layer.

There are several points in a connection where the order of transactions can be observed: (a) the order in which the master module M presents CMD messages to the ANIP, (b) the order in which the CMDs are delivered to the slave module S1, S2 by the PNIP, (c) the order in which the slave module S1, S2 presents the responses to the PNIP, and (d) the order the responses are delivered to the master by the ANIP. Note that not all of (b), (c), and (d) are always present. Moreover, there are no assumptions about the order in which the slaves execute transactions; only the order of the responses can be observed. The order of the transaction execution by the slaves is considered to be a system decision, and not a part of the interconnect protocol.

At both ANIP and PNIPs, outgoing messages belonging to different transactions on the same connection are allowed to be interleaved. For example, two write commands can be issued, and only afterwards their data. If the order of OUTDATA messages differs from the order of CMD messages, transaction identifiers must be introduced to associate OUTDATAs with their corresponding CMD.

Outgoing messages can be delivered by the PNIPs to the slaves (see b) as follows:

Unordered, which imposes no order on the delivery of the outgoing messages of different transactions at the PNIPs.

Ordered locally, where transactions must be delivered to each PNIP in the order they were sent (a), but no order is imposed across PNIPs. Locally-ordered delivery of the outgoing messages can be provided either by an ordered data transportation, or by reordering outgoing messages at the PNIP.

Ordered globally, where transactions must be delivered in the order they were sent, across all PNIPs of the connection. Globally-ordered delivery of the outgoing part of transactions require a costly synchronization mechanism.

Transaction response messages can be delivered by the slaves to the PNIPs (c) as Ordered, when RETDATA and RETSTAT messages are returned in the same order as the CMDs were delivered to the slave (b), or as Unordered, otherwise. When responses are unordered, there has to be a mechanism to identify the transaction to which a response belongs. This is usually done using tags attached to messages for transaction identifications (similar to tags in VCI).

Response messages can be delivered by the ANIP to the master (see d) as follows:

Unordered, which imposes no order on the delivery of responses. Here, also, tags must be used to associate responses with their corresponding CMDs.

Ordered locally, where RETDATA and RETSTAT messages of transactions for a single slave are delivered in the order the original CMDs were presented by the master to the ANIP. Note that there is no ordering imposed for transactions to different slaves within the same connection.

Globally ordered, where all responses in a connection are delivered to the master in the same order as the original CMDs. When transactions are pipelined on a connection, then globally-ordered delivery of responses requires reordering at the ANIP.

All 3×2×3=18 combinations between the above orderings are possible. Out of these, we define and offer the following two. An unordered connection is a connection in which no ordering is assumed in any part of the transactions. As a result, the responses must be tagged to be able identify to which transaction they belong. Implementing unordered connections has low cost, however, they may be harder to use, and introduce the overhead of tagging.

An ordered connection is defined as a connection with local ordering for the outgoing messages from PNIPs to slaves, ordered responses at the PNIPs, and global ordering for responses at the ANIP. We choose local ordering for the outgoing part because the global ordering has a too high cost, and has few uses. The ordering of responses is selected to allow a simple programming model with no tagging. Global ordering at the ANIP is possible at a moderate cost, because all the reordering is done locally in the ANIP. A user can emulate connections with global ordering of outgoing and return messages at the PNIPs using non-pipelined acknowledged transactions, at the cost of high latency.

In the network, throughput can be reserved for connections in a time-division multiple access (TDMA) fashion, where bandwidth is split in fixed-size slots on a fixed time frame. Bandwidth, as well as bounds on latency and jitter can be guaranteed when slots are reserved. They are all defined in multiples of the slots.

As mentioned earlier, the network guarantees that messages are delivered to the NI. Messages sent from one of the NIPs are not immediately visible at the other NIP, because of the multi-hop nature of networks. Consequently, handshakes over a network would allow only a single message be transmitted at a time. This limits the throughput on a connection and adds latency to transactions. To solve this problem, and achieve a better network utilization, the messages must be pipelined. In this case, if the data is not consumed at the PNIP at the same rate it arrives, either flow control must be introduced to slow down the producer, or data may be lost because of limited buffer space at the consumer NI.

A set of NoC services is defined that abstract from the network details. Using these services in IP design decouples computation and communication. A request-response transaction model is used to be close to existing on-chip interconnect protocols. This eases the migration of current IPs to NoCs. To fully utilize the NoC capabilities, such as high bandwidth and transaction concurrency, connection-oriented communication are provided. Connections can be configured independently with different properties. These properties include transaction completion, various transaction orderings, bandwidth lower bounds, latency and jitter upper bounds, and flow control.

As described above, NoCs have different properties from both existing off-chip networks and existing on-chip interconnects. As a result, existing protocols and service interfaces cannot be adopted directly to NoCs, but must take the characteristics of NoCs into account. For example, a protocol such as TCP/IP assumes the network is lossy, and includes significant complexity to provide reliable communication. Therefore, it is not suitable in a NoC where we assume data transfer reliability is already solved at a lower level. On the other hand, existing on-chip protocols such as VCI, OCP, AMBA, or CoreConnect are also not directly applicable. For example, they assume ordered transport of data: if two requests are initiated from the same master, they will arrive in the same order at the destination. This does not hold automatically for NoCs. Atomic chains of transactions and end-to-end flow control also need special attention in a NoC interface.

The modules as described in FIGS. 1 and 2 can be so-called intellectual property blocks IPs (computation elements, memories, or subsystems containing interconnect modules) that interact with network at said network interfaces NI. NIs provide NI ports NIP through which the communication services are accessed. A NI can have several NIPs to which one or more IPs can be connected. Similarly, an IP can be connected to more than one NI and NIP.

The communication over the network is performed by the network interfaces on connections, i.e. the initiator and the target module are invisible to the network. Connections are introduced to describe and identify communication with different properties, such as guaranteed throughput, bounded latency and jitter, ordered delivery, or flow control. For example, to distinguish and independently guarantee communication of 1 Mbs and 25 Mbs, two connections can be used. Two NIPs can be connected by multiple connections, possibly with different properties. Connections as defined here are similar to the concept of threads and connections from OCP and VCI. Where in OCP and VCI connections are used only to relax transaction ordering, we generalize from only the ordering property to include configuration of buffering and flow control, guaranteed throughput, and bounded latency per connection.

The connections according to the embodiments of the invention must be first created or established with the desired properties before being used. This may result in resource reservations inside the network (e.g., buffer space, or percentage of the link usage per time unit). If the requested resources are not available, the network RN will refuse the request. After usage, connections are closed, which leads to freeing the resources occupied by that connection.

To allow more flexibility in configuring connections, and, hence, better resource allocation per connection, the outgoing and return parts of connections can be configured independently. For example, a different amount of buffer space can be allocated in the NIPs at the master and slaves, or different bandwidths can be reserved for requests and responses.

Communication takes place on connections using transaction, consisting of a request and possibly a response. The request encodes an operation (e.g., read, write, flush, test and set, nop) and possibly carries outgoing data (e.g., for write commands). The response returns data as a result of a command (e.g., read) and/or an acknowledgment. Connections involve at least two NIPs. Transactions on a connection are always started at one and only one of the NIPs, called the connections active NIP (ANIP). All the other NIPs of the connection are called passive NIPs (PNIP).

There can be multiple transactions active on a connection at a time, but more generally than for split buses. That is, transactions can be started at the ANIP of a connection while responses for earlier transactions are pending. If a connection has multiple slaves, multiple transactions can be initiated towards different slaves. Transactions are also pipelined between a single master-slave pair for both requests and responses. In principle, transactions can also be pipelined within a slave, if the slave allows this.

A transaction can be composed from the following messages:

A command message (CMD) is sent by the ANIP, and describes the action to be executed at the slave connected to the PNIP. Examples of commands are read, write, test and set, and flush. Commands are the only messages that are compulsory in a transaction. For NIPs that allow only a single command with no parameters (e.g., fixed-size address-less write), we assume the command message still exists, even if it is implicit (i.e., not explicitly sent by the IP).

An out data message (OUTDATA) is sent by the ANIP following a command that requires data to be executed (e.g., write, multicast, and test-and-set).

A return data message (RETDATA) is sent by a PNIP as a consequence of a transaction execution that produces data (e.g., read, and test-and-set).

A completion acknowledgment message (RETSTAT) is an optional message which is returned by PNIP when a command has been completed. It may signal either a successful completion or an error. For transactions including both RETDATA and RETSTAT the two messages can be combined in a single message for efficiency. However, conceptually, they exist both: RETSTAT to signal the presence of data or an error, and RETDATA to carry the data. In bus-based interfaces RETDATA and RETSTAT typically exist as two separate signals.

Messages composing a transaction are divided in outgoing messages, namely CMD and OUTDATA, and response messages, namely RETDATA, RETSTAT. Within a transaction, CMD precedes all other messages, and RETDATA precedes RETSTAT if present. These rules apply both between master and ANIP, and PNIP and slave.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

Furthermore, any reference signs in the claims shall not be construed as limiting the scope of the claims.

The invention claimed is:

1. An integrated circuit comprising:
   (a) a plurality of modules comprising a plurality of message sending modules M and a plurality of message receiving modules S;
   (b) a network configured to exchange messages between said plurality of message sending modules M and said plurality of message receiving modules S based on request-response transactions;
   (c) active network interface means associated with each of said plurality of message sending modules M;
   (d) passive network interface means associated with each of said plurality of message receiving modules S,
   wherein said active and passive network interface means are configured to manage communication between said plurality of message sending modules M and said plurality of message receiving modules S by sending requests encoding operations, such as read, write, flush, test, set and nop, between the plurality of message sending modules M and the plurality of message receiving modules S;
   wherein said active network interface means is configured to perform communication management functions by receiving message requests issued by said plurality of message sending modules M including first information and second information,
   wherein said first information is indicative of a location of a message receiving module S within the network being addressed by one of said plurality of message sending modules M in said message request and is comprised of (1) a connection identifier identifying two or more message receiving modules S and (2) a port identifier of the passive network interface means, and
   wherein said second information is indicative of a particular location within the message receiving module S, such as memory or register address,
   wherein said active network interface means includes address translation means adapted to arrange said first information and said second information as a single address and determine from said received message requests which of said message receiving modules S is being addressed in said message requests issued from said plurality of message sending modules M based on said single address and further determine the particular location within the addressed message receiving module S based on said single address.

2. The integrated circuit according to claim 1, wherein said address translation means comprises an address mapping table configured to store relations between global and local memory mapping.

3. Integrated circuit according to claim 2, wherein said address mapping table contains fields for every channel of a connection between said message sending module M and at least one addressed message receiving module S, for network interface ports of a connection, and for local addresses in said at least one addressed message receiving module.

4. A method for exchanging messages in an integrated circuit comprising a plurality of modules, the messages between the plurality of modules being exchanged via a network wherein a message issued by an addressing module M comprises:
   first information indicative of a location of an addressed message receiving module S within the network and is comprised of (1) a connection identifier identifying two or more message receiving modules S and (2) an identifier of a passive network interface means associated with the addressed message receiving module S, and second information indicative of a particular location within the addressed message receiving module S, such as a memory, or a register address, the method including the steps of:
   (a) issuing from said addressing module M a message request including said first information, said second information, and data and/or connection properties to an address translation unit included as part of an active network interface module associated with said addressing module M,
   (b) arranging, at said address translation unit, the first and the second information comprising said issued message as a single address,
   (c) determining, at said address translation unit, which message receiving module S is being addressed in said message request issued from said addressing module M based on said single address, and (d) further determining, at said address translation unit, the particular location within the addressed message receiving module S based on said single address.

5. The method according to claim 4, wherein communication between said plurality of modules is performed over connections.

6. The method according to claim 5, wherein a connection comprises a set of channels, each channel having a set of connection properties between said addressing module M and at least one message receiving module.

7. The method according to claim 5, wherein connection types comprise: simple connections, multicast connections, narrowcast connections.

8. The method according to claim 6, wherein said connection properties comprise: ordering, flow control, throughput, latency, lossiness, transmission termination, transaction completion, data correctness, priority and data delivery.

9. The method according to claim 7, wherein said simple connection is a connection between said addressing module M and a single addressed message receiving module S.

10. The method according to claim 7, wherein said multicast and narrowcast connections are connections between said addressing module M and one or more addressed message receiving modules S.

11. The method according to claim 4, wherein said active network interface module comprises at least two network interface ports to allow an addressing module M associated with said active network interface module to communicate with a router network or at least one other message receiving module S from among said two or more message receiving modules S.

* * * * *